US012086552B2

(12) United States Patent
Hoang et al.

(10) Patent No.: US 12,086,552 B2
(45) Date of Patent: Sep. 10, 2024

(54) GENERATING SEMANTIC VECTOR REPRESENTATION OF NATURAL LANGUAGE DATA

(71) Applicant: INTERNATIONAL BUSINESS MACHINES CORPORATION, Armonk, NY (US)

(72) Inventors: Thanh Lam Hoang, Maynooth (IE); Gabriele Picco, Dublin (IE); Vanessa Lopez Garcia, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 17/656,418

(22) Filed: Mar. 24, 2022

(65) Prior Publication Data

US 2023/0306203 A1 Sep. 28, 2023

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06N 3/04* (2013.01); *G06N 3/08* (2013.01)

(58) Field of Classification Search
CPC ......... G06F 40/30; G06F 40/205; G06N 3/04; G06N 3/08; G06N 5/022
(Continued)

(56) References Cited

U.S. PATENT DOCUMENTS 6,601,223 B1 * 7/2003 Puri ..................... G06F 30/33
716/113
7,302,382 B2 * 11/2007 Maxwell, III ........ G06F 40/284
704/4
(Continued)

FOREIGN PATENT DOCUMENTS

CN 107578106 B 1/2018

OTHER PUBLICATIONS

Chen et al., "Relation Extraction with Contextualized Relation Embedding (CRE)", ARXIV, Nov. 19, 2020, 8 Pages. https://arxiv.org/pdf/2011.09658.pdf.
(Continued)

*Primary Examiner* — Thuykhanh Le
(74) *Attorney, Agent, or Firm* — Steven M. Bouknight

(57) ABSTRACT

A computer-implemented method for automatically generating a semantic vector representation of a relation between a specific set of entities in natural language text is provided. The method may include, in response to receiving a text segment comprising a set of entities, automatically parsing the text segment into an abstract meaning representation (AMR) graph comprising nodes representing the set of entities. The method may further include extracting a number of minimum Steiner trees from the AMR graph, and wherein each Steiner tree comprises a minimum amount of edges between the nodes corresponding to a first entity and at least one second entity. The method may further include using a trained graph neural network (GNN) to determine vector embeddings for the minimum Steiner trees. The method may further include aggregating the vector embeddings to generate the semantic vector representation of the relation between the specific set of entities.

20 Claims, 9 Drawing Sheets

(51) Int. Cl.
  *G06N 3/04* (2023.01)
  *G06N 3/08* (2023.01)
  *G06N 5/022* (2023.01)
(58) Field of Classification Search
  USPC ............................................................ 704/9
  See application file for complete search history.

(56) References Cited

U.S. PATENT DOCUMENTS

| | | | | |
|---|---|---|---|---|
| 7,484,199 | B2* | 1/2009 | Alpert | G06F 30/18 |
| | | | | 716/134 |
| 10,474,962 | B2 | 11/2019 | Hakkani-Tur | |
| 11,354,479 | B1* | 6/2022 | Chapman | G06F 30/398 |
| 11,620,428 | B1* | 4/2023 | Chapman | G06F 30/396 |
| | | | | 716/113 |
| 11,636,270 | B2* | 4/2023 | Lin | G06F 16/55 |
| | | | | 704/9 |
| 11,669,690 | B2* | 6/2023 | Dai | G06F 40/295 |
| | | | | 704/9 |
| 11,704,486 | B2* | 7/2023 | Wu | G06N 3/045 |
| | | | | 704/9 |
| 11,727,216 | B2* | 8/2023 | Liu | G06N 5/022 |
| | | | | 704/9 |
| 11,741,316 | B2* | 8/2023 | Galitsky | G06F 40/44 |
| | | | | 704/9 |
| 2002/0184607 | A1* | 12/2002 | Alpert | G06F 30/392 |
| | | | | 716/114 |
| 2003/0163301 | A1* | 8/2003 | Maxwell, III | G06F 40/289 |
| | | | | 704/9 |
| 2004/0123261 | A1* | 6/2004 | Alpert | G06F 30/394 |
| | | | | 716/114 |
| 2004/0216072 | A1* | 10/2004 | Alpert | G06F 30/394 |
| | | | | 716/114 |
| 2006/0122993 | A1* | 6/2006 | Dettinger | G06F 16/24526 |
| 2006/0161557 | A1* | 7/2006 | Dettinger | G06F 16/2452 |
| 2007/0143263 | A1* | 6/2007 | Agrawal | G06F 16/951 |
| 2007/0159984 | A1* | 7/2007 | Hentschke | H04L 45/00 |
| | | | | 370/254 |
| 2008/0301618 | A1* | 12/2008 | Daellenbach | G06F 30/394 |
| | | | | 716/129 |
| 2010/0199243 | A1* | 8/2010 | Sze | G06F 30/3312 |
| | | | | 716/113 |
| 2012/0078613 | A1* | 3/2012 | Kandekar | G06F 3/04842 |
| | | | | 704/9 |
| 2013/0173255 | A1* | 7/2013 | Ehsani | G06F 40/216 |
| | | | | 704/9 |
| 2016/0085741 | A1* | 3/2016 | Blanchflower | G06F 40/226 |
| | | | | 704/9 |
| 2016/0359727 | A1* | 12/2016 | Aas | G06F 30/18 |
| 2018/0144424 | A1* | 5/2018 | Sahu | G16H 10/20 |
| 2018/0165405 | A1* | 6/2018 | Braun | G06F 30/398 |
| 2019/0173781 | A1* | 6/2019 | Folberth | G06F 30/396 |
| 2019/0230046 | A1* | 7/2019 | Djukic | H04L 47/76 |
| 2020/0074301 | A1* | 3/2020 | Shang | G06N 5/022 |
| 2020/0311198 | A1* | 10/2020 | Poon | G06N 20/20 |
| 2021/0029045 | A1* | 1/2021 | Prasad et al. | H04L 12/4625 |
| 2021/0216722 | A1* | 7/2021 | Dai | G06F 40/30 |
| 2021/0224588 | A1* | 7/2021 | Sikand | G06F 18/2321 |
| 2021/0391080 | A1* | 12/2021 | Fan | G06F 40/295 |
| 2022/0138432 | A1* | 5/2022 | Galitsky | G06F 40/211 |
| | | | | 704/9 |
| 2022/0147836 | A1* | 5/2022 | Zhao | G06N 3/048 |
| 2022/0164505 | A1* | 5/2022 | Mosca | G06N 10/20 |
| 2022/0294757 | A1* | 9/2022 | Khasanova | H04L 61/4511 |
| 2022/0375551 | A1* | 11/2022 | Patel | G06N 5/04 |
| 2023/0061778 | A1* | 3/2023 | Song | G06F 40/35 |
| 2023/0094800 | A1* | 3/2023 | Latapie | G06N 3/08 |
| | | | | 705/333 |
| 2023/0100376 | A1* | 3/2023 | Liu | G06F 40/30 |
| | | | | 704/9 |
| 2023/0109045 | A1* | 4/2023 | Mattivi | G06N 20/00 |
| | | | | 704/9 |
| 2023/0118359 | A1* | 4/2023 | Wang | H04L 12/44 |
| | | | | 370/254 |
| 2023/0133717 | A1* | 5/2023 | Sun | G06F 40/30 |
| | | | | 704/9 |
| 2023/0153541 | A1* | 5/2023 | Carbajales | G06F 40/205 |
| | | | | 704/9 |
| 2023/0185788 | A1* | 6/2023 | Bordawekar | G06F 16/2453 |
| | | | | 707/742 |
| 2023/0186021 | A1* | 6/2023 | Sprott | G06F 40/40 |
| | | | | 704/9 |
| 2023/0186058 | A1* | 6/2023 | Partin-Vaisband | |
| | | | | G06N 3/0464 |
| | | | | 706/27 |
| 2023/0186087 | A1* | 6/2023 | Partin-Vaisband | G06F 30/394 |
| | | | | 706/25 |
| 2023/0229570 | A1* | 7/2023 | Cepek | G06F 11/1476 |
| | | | | 382/155 |
| 2023/0244968 | A1* | 8/2023 | Gurin | G06N 3/0475 |
| | | | | 706/11 |
| 2023/0245258 | A1* | 8/2023 | Ma | G06N 5/022 |
| | | | | 705/328 |
| 2023/0252234 | A1* | 8/2023 | Hoang | G06N 3/042 |
| | | | | 704/9 |
| 2023/0297553 | A1* | 9/2023 | Zhao | G06F 16/2228 |
| | | | | 707/748 |
| 2023/0297782 | A1* | 9/2023 | Akima | G06F 40/40 |
| | | | | 704/9 |
| 2023/0297855 | A1* | 9/2023 | Hoang | G06N 3/042 |
| | | | | 706/52 |

OTHER PUBLICATIONS

Levy, et al., "Dependency-based Word Embeddings", Proceedings of the 52nd Annual Meeting of the Association for Computational Linguistics (Short Papers), Jun. 23-25, 2014, pp. 302-308. https://aclanthology.org/P14-2050.pdf.

Lin, et al., "Learning Entity and Relation Embeddings for Knowledge Graph Completion", Association for the Advancement of Artificial Intelligence, 2015, pp. 2181-2187. https://www.aaai.org/ocs/index.php/AAAI/AAAI15/paper/viewFile/9571/9523.

Lin, et al., "Learning Entity and Relation Embeddings for Knowledge Resolution", ScienceDirect, International Conference on Computational Science, ICCS, Jun. 12-14, 2017, pp. 345-354.https://reader.elsevier.com/reader/sd/pii/S1877050917305628?token=DEDDADF42AAE98A5CF57D708A5E10C6F532B82E534A5EAA3C79D7C5DCFCE94BA43B7850E147F199CDAE758F7753501BB&originRegion=us-east-1&originCreation=20220316180411.

Soares, et al., "Matching the Blanks: Distributional Similarity for Relation Learning", ARXIV, Jun. 7, 2019, 10 Pages. https://arxiv.org/abs/1906.03158.

Su, et al., "Global relation embedding for relation extraction", Association for Computational Linguistics, Proceedings of NAACL-HLT, Jun. 1-6, 2018, pp. 820-830. https://aclanthology.org/N18-1075/.

Sun, et al., "Reasoning Over Virtual Knowledge Bases With Open Predicate Relations", PMLR 139, Proceedings of the 38th International Conference on Machine Learning, 2021, Jun. 14, 2021, https://arxiv.org/pdf/2102.07043.pdf.

Veira et al., "Unsupervised Embedding Enhancements of Knowledge Graphs using Textual Associations," Proceedings of the Twenty-Eighth International Joint Conference on Artificial Intelligence (IJCAI-19), pp. 5218-5225, 2019.

Wang, et al., "Dependency and AMR Embeddings for Drug-Drug Interaction Extraction from Biomedical Literature", ACM-BCB'17, Aug. 20-23, 2017, pp. 36-43. https://dl.acm.org/doi/10.1145/3107411.3107426.

Xu, et al., "Classifying relations via long-short term memory networks along shortest dependency paths", Association for Computational Linguistics, Proceedings of the 2015 Conference on Empirical Methods in Natural Language Processing, Sep. 2015, pp. 1785-1794. https://aclanthology.org/D15-1206/.

Xu, et al., "Relation Embedding with Dihedral Group in Knowledge Graph", Association for Computational Linguistics, Proceedings of

(56) References Cited

OTHER PUBLICATIONS the 57th Annual Meeting of the Association for Computational Linguistics, Jul. 28-Aug. 2, 2019, pp. 263-272. https://www.aclweb.org/anthology/P19-1026/.

Zhang, et al., "Abstract Meaning Representation Guided Graph Encoding and Decoding for Joint Information Extraction," Proceedings of the 2021 Conference of the North American Chapter of the Association for Computational Linguistics: Human Language Technologies, 2021, pp. 39-49.

Ziegler, et al., "Injecting Semantic Background Knowledge into Neural Networks using Graph Embeddings," 2017 IEEE 26th International Conference on Enabling Technologies: Infrastructure for Collaborative Enterprises (WETICE), 2017, 9 Pages.

Mell et al., "The NIST Definition of Cloud Computing", Recommendations of the National Institute of Standards and Technology, NIST Special Publication 800-145, Sep. 2011, 7 pages.

\* cited by examiner

GENERATING SEMANTIC VECTOR REPRESENTATION OF NATURAL LANGUAGE DATA

BACKGROUND

The present invention relates generally to the field of computing, and more specifically, to natural language processing (NLP).

Generally, natural language processing (NLP) is a subfield of linguistics, computer science, and artificial intelligence concerned with the interactions between computers and natural language, and in particular, how to program computers to process and analyze large amounts of natural language data. The goal is to have a computer capable of understanding the contents of documents, including the contextual nuances of the language within them. In turn, computers may accurately extract information and insights contained in the documents as well as categorize and organize the documents themselves. Furthermore, in NLP, word embedding is a term used for the representation of words for text analysis, typically in the form of a real-valued vector that encodes the meaning of the word such that the words that are closer in the vector space are expected to be similar in meaning. Word embeddings can be obtained using a set of language modeling and feature learning techniques where words or phrases from the vocabulary are mapped to vectors of real numbers. Methods to generate this mapping include neural networks, dimensionality reduction on a word co-occurrence matrix, probabilistic models, explainable knowledge base method, and explicit representation in terms of the context in which words appear. Word and phrase embeddings, when used as the underlying input representation, have been shown to boost the performance in NLP tasks such as syntactic parsing and sentiment analysis.

SUMMARY

A method for automatically generating a semantic vector representation of a relation between a specific set of entities in natural language text is provided. The method may include, in response to receiving a text segment comprising a set of entities, automatically parsing the text segment into an abstract meaning representation (AMR) graph comprising nodes representing the set of entities. The method may further include extracting a number of minimum Steiner trees from the AMR graph, in the cases of two or more entities wherein each Steiner tree represents a path/tree between a first entity and at least one second entity from the set of entities, and wherein each Steiner tree comprises a minimum amount of edges between the nodes corresponding to the first entity and the at least one second entity. The method may further include training and using a trained graph neural network (GNN) to determine vector embeddings for each of the extracted number of minimum Steiner trees. The method may further include in response to receiving the vector embeddings returned by the trained GNN, aggregating the vector embeddings to generate the semantic vector representation of the relation between the specific set of entities.

A computer system for automatically generating a semantic vector representation of a relation between a specific set of entities in natural language text is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to receiving a text segment comprising a set of entities, automatically parsing the text segment into an abstract meaning representation (AMR) graph comprising nodes representing the set of entities. The method may further include extracting a number of minimum Steiner trees from the AMR graph, wherein each Steiner tree represents a path/tree between a first entity and at least one second entity from the set of entities, and wherein each Steiner tree comprises a minimum amount of edges between the nodes corresponding to the first entity and the at least one second entity. The method may further include training and using a trained graph neural network (GNN) to determine vector embeddings for each of the extracted number of minimum Steiner trees. The method may further include in response to receiving the vector embeddings returned by the trained GNN, aggregating the vector embeddings to generate the semantic vector representation of the relation between the specific set of entities.

A computer program product for automatically generating a semantic vector representation of a relation between a specific set of entities in natural language text is provided. The computer program product may include one or more computer-readable storage devices and program instructions stored on at least one of the one or more tangible storage devices, the program instructions executable by a processor. The computer program product may include program instructions to, in response to receiving a text segment comprising a set of entities, automatically parse the text segment into an abstract meaning representation (AMR) graph comprising nodes representing the set of entities. The computer program product may further include program instructions to extract a number of minimum Steiner trees from the AMR graph, wherein each Steiner tree represents a path/tree between a first entity and at least one second entity from the set of entities, and wherein each Steiner tree comprises a minimum amount of edges between the nodes corresponding to the first entity and the at least one second entity. The computer program product may also include program instructions to train and use a trained graph neural network (GNN) to determine vector embeddings for each of the extracted number of minimum Steiner trees. The computer program product may further include program instructions to, in response to receiving the vector embeddings returned by the trained GNN, aggregate the vector embeddings to generate the semantic vector representation of the relation between the specific set of entities.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
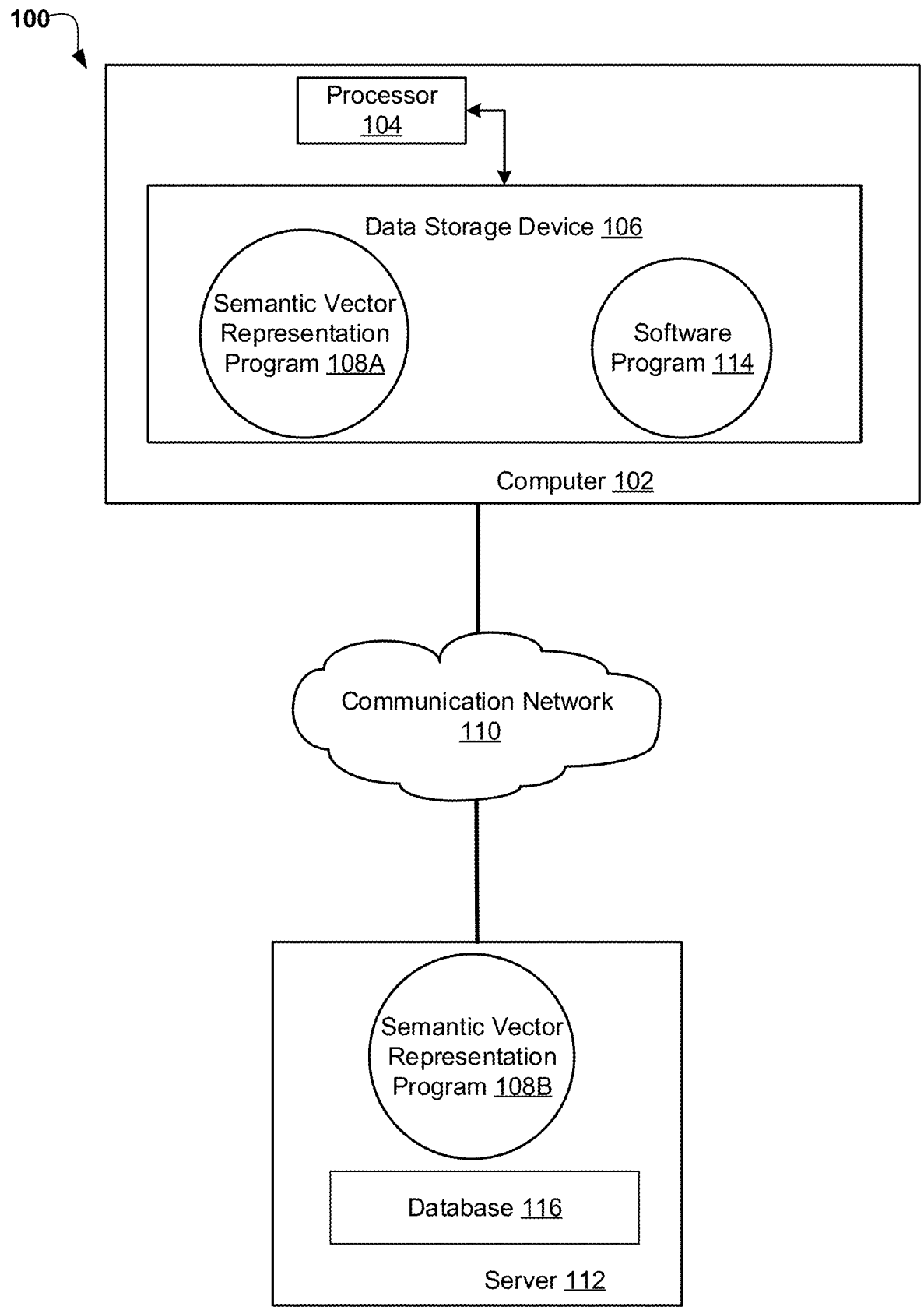
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to natural language processing. More specifically, the following described exemplary embodiments provide a system, method and computer program product for automatically generating a semantic vector representation of a relation between a specific set of entities in natural language text based on an abstract meaning representation (AMR) graph. Therefore, the present embodiment has the capacity to improve the technical field associated natural language processing by improving the representation of the relations between multiple entities in a natural language sentence by identifying and extracting a number of paths/trees/connections between entities in an AMR graph and generating a semantic vector representation that aggregates the paths/trees/connections. In turn, the semantic vector representation generated by the present embodiments may provide a better representation of the relation between multiple entities in a natural language sentence.

As previously described with respect to natural language processing (NLP), word vector embedding is a term used for the representation of words for text analysis, typically in the form of a real-valued vector that encodes the meaning of the word. Word and phrase embeddings, when used as the underlying vector representation, have been shown to boost the performance in NLP tasks such as syntactic parsing and semantic parsing. Specifically, representing the semantics of linguistic items (such as natural language text) in a machine-interpretable form has been a major goal of NLP since its earliest days. For example, semantic parsing is the task of converting a natural language utterance to a logical form: a machine-understandable representation of its meaning. Semantic parsing can thus be understood as extracting the precise meaning of an utterance. Applications of semantic parsing include machine translation, question answering, ontology induction, automated reasoning, and code generation. In accordance with representing the semantics of natural language text in machine-interpretable form, effectively representing a relation between a pair of entities in an input sentence via neural network models is an important problem in NLP. Accordingly, relation recognition/extraction between named entities similarly has widespread applications in question answering, information extraction, natural language understanding, knowledge graph construction and so forth. However, current state-of-the-art solutions for relation recognition/extraction are based on deep neural networks where the deep neural networks are simply fed with a sentence and expected to predict relation labels between pairs of entities in the sentence.

For example, one of the most popular solutions for representing relations between entities considers the presentation of a sentence plus the positions of the entities in the sentence to represent the relation. However, this representation has limitations when the sentence has multiple pairs of entities. Furthermore, determining whether two entities are related simply based on the positions of the entities in the sentence is a trivial representation of the relation. Other methods are based on tokens embeddings, whereby embedding vectors of the token corresponding to the entities are concatenated. Some techniques may also add special tokens to mark the start and the end of the entities in a sentence, and then use the embedding of the special token as embedding vectors. However, these ad-hoc solutions do not guarantee that the learned embedding represents the true semantic relations between entities.

As such, it may be advantageous, among other things, to provide a system, method, and program product for generating a semantic vector representation of a relation between a specific set of entities in natural language text. Specifically, the method, computer system, and computer program product may train a graph neural network (GNN) to generate vector embeddings by receiving as input a text corpus; dividing the text corpus into text segments (i.e. one or more sentences); parsing the text segments into abstract meaning representation (AMR) graphs using an AMR parser; and then inputting the AMR graphs as training data into the GNN and training the GNN to determine vector embeddings of the nodes and edges in the AMR graph. In turn, the method, computer system, and computer program product may generate the semantic vector representation of a relation between a specific set of entities in a natural language sentence by receiving a text segment (or sentence) that includes a set of entities; parsing the sentence into an AMR graph that includes nodes representing the set of entities; extracting a number (k) of minimum Steiner trees (or paths/trees) from the AMR graph that connects the set of entities (whereby each Steiner tree includes the smallest number of edges between nodes); masking each node/entity in the Steiner trees; inputting the extracted Steiner trees including the masked nodes into the trained GNN to determine the vector embeddings of the nodes and edges of the AMR graph; and in response to receiving the vector embeddings, aggregating (or taking a vector aggregation function value of) the vector embeddings returned by the trained GNN, and presenting the aggregated vector embeddings as the semantic vector representation of the relation between the entities.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a semantic vector representation program 108A and a software program 114, and may also include a microphone (not shown). The software program 114 may be an application program such as a cloud-based solution, Internet browser, and/or one or more program and apps running on a client computer 102, such as a desktop, laptop, tablet, and/or mobile phone device. The semantic vector representation program 108A may communicate with the software program 114. The networked computer environment 100 may also include a server 112 that is enabled to run a semantic vector representation program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users. The network computer environment 100 may also be part of a cloud computing environment.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. The client computer 102 may communicate with the server computer 112 via the communications network 110. The communications network 110 may include connections, such as wire, wireless communication links, or fiber optic cables. As will be discussed with reference to FIG. 7, client computer 102 and server computer 112 may include internal components 710 and external components 750. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the semantic vector representation program 108A, 108B may interact with a database 116 that may be embedded in various storage devices, such as, but not limited to, a mobile device 102, a networked server 112, or a cloud storage service.

According to the present embodiment, a program, such as a semantic vector representation program 108A and 108B may run on the client computer 102 and/or on the server computer 112 via a communications network 110. The semantic vector representation program 108A, 108B may automatically generate a semantic vector representation of a relation between a specific set of entities in natural language text. Specifically, a client computer 102, such as a desktop computer, laptop computer, tablet, and/or mobile device, may run a semantic vector representation program 108A, 108B, that may interact with a database 116 and a software program 114, to automatically generate the semantic vector representation of a relation between the specific set of entities in natural language sentence by receiving a text segment (or the sentence) that includes a set of entities; parsing the sentence into an AMR graph that includes nodes representing the set of entities; extracting a number (n) of minimum Steiner trees (or paths/trees) from the AMR graph that connects the set of entities (whereby each Steiner tree includes the smallest number of edges between nodes); optionally masking each node/entity in the Steiner trees; inputting the extracted Steiner trees (including masked nodes) into the trained GNN to determine the vector embeddings of the nodes and edges of the AMR graph; and in response to receiving the vector embeddings, aggregating (or taking a vector aggregation function value of) the vector embeddings returned by the trained GNN, and presenting the aggregated vector embeddings as the semantic vector representation of the relation between the entities.

Figure 2:
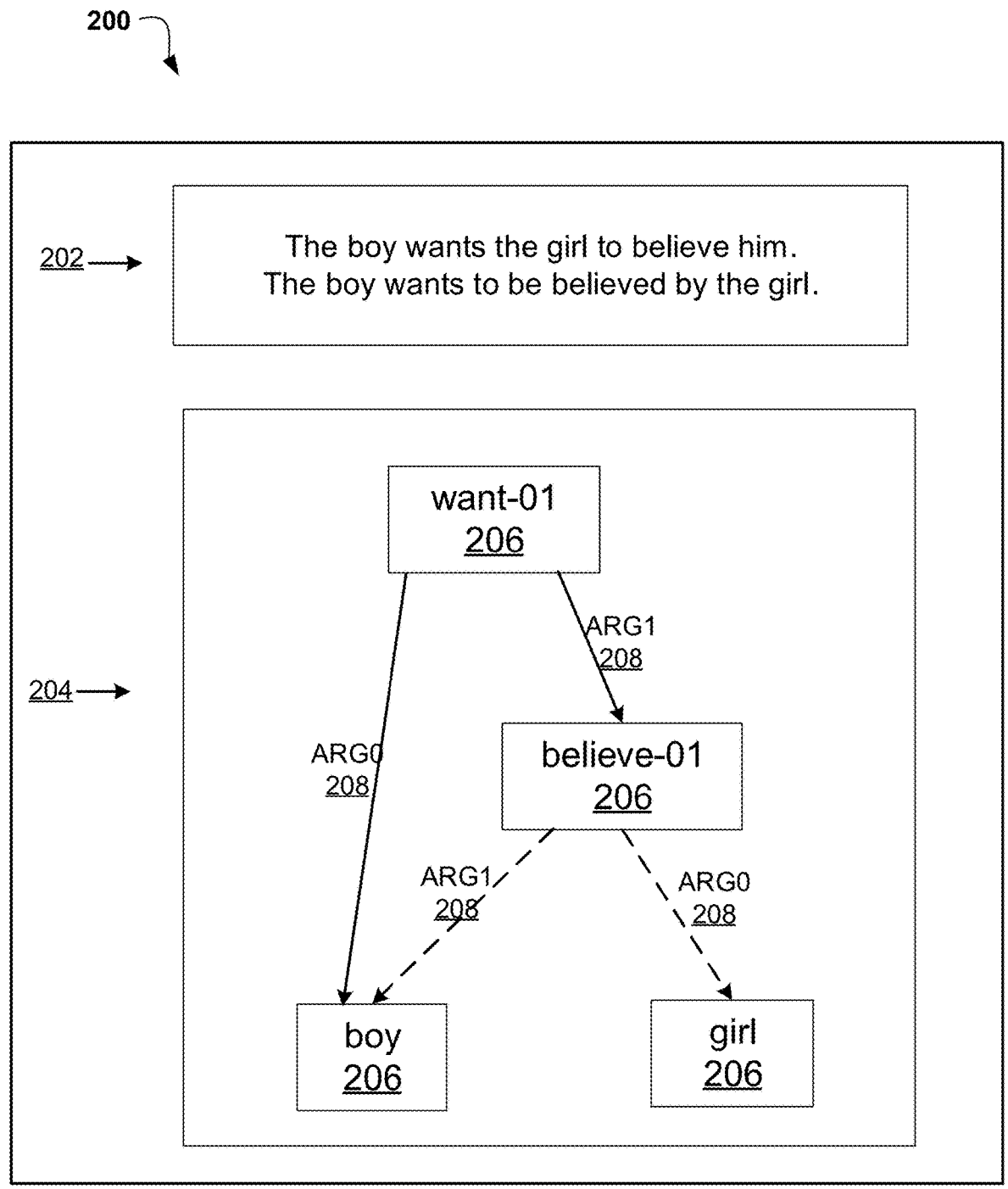
FIG. 2 is an example diagram illustrating an abstract meaning representation (AMR) graph that may be generated by a program for automatically generating a semantic vector representation of a relation between a specific set of entities and may be received by a graph neural network (GNN) according to one embodiment.

Referring now to FIG. 2, an example diagram 200 illustrating an example of an abstract meaning representation (AMR) graph 204 that may be generated by the semantic vector representation program 108A, 108B and received by a graph neural network (GNN) according to one embodiment is depicted. Specifically, abstract meaning representation (AMR) is a semantic representation language, whereby AMR graphs are rooted, labeled, directed acyclic graphs (DAGs) representing whole sentences based on PENMAN notation. More specifically, AMR graphs are intended to abstract away from syntactic representations, in the sense that sentences which are similar in meaning should be assigned the same AMR even if the sentences are not identically worded. Accordingly, and as depicted in diagram 200, an example of two sentences 202 that are not identically worded but have the same meaning may be received by the semantic vector representation program 108A, 108B, and the semantic vector representation program 108A, 108B may in turn generate an AMR graph 204 which depicts that meaning in machine-readable form. As previously described, the AMR graph 204 may be a rooted, labeled, DAG representing whole sentences based on PENMAN notation such that nodes 206 may represent concepts (including entities), edges 208 may represent semantic relations between nodes 206, and function words such as "to" may be omitted altogether. Accordingly, and as further depicted in diagram 200, the two sentences 202 may include concepts such as two entities, boy and girl, which may be represented by nodes 206 in the AMR graph 204 generated by the semantic vector representation program 108A, 108B. Nodes 206 may also include concepts such as verbs, including the verbs "want" and "believe/believed" from the two sentences 202 in nodes 206 as well.

Furthermore, each node 206 may have a different semantic relation/role to another node 206 and that semantic relation/role may be represented by the edges 208 including arguments (i.e. ARG0 and ARG1) as depicted in the AMR graph 204. For example, the semantic vector representation program 108A, 108B may identify and depict in the AMR graph 204 the different semantic relations/roles that the verb "wants" plays in the two sentences. Specifically, for example, and based on PENMAN notation, the different semantic roles of the verb "wants" in the two sentences may be depicted as follows:

ARG0: represents the wanter (i.e. the boy is the wanter, as depicted in the AMR graph 204 in the edge 208 between the nodes 206 corresponding to want-01 and boy);

ARG1: represents the thing wanted (i.e. the boy wants to be believed, as depicted in the AMR graph 204 in the edge 208 between the nodes 206 corresponding to want-01 and believe-01).

Similarly, the semantic vector representation program 108A, 108B may identify and depict in the AMR graph 204 the different semantic relations/roles that the verb "believe/believed" plays in the two sentences. Specifically, for example, and based on PENMAN notation, the different semantic roles of the verb "believe/believed" in the two sentences may be depicted as follows:

ARG0: represents the believer (i.e. the girl is the believer, as depicted in the AMR graph 204 in the edge 208 between the nodes 206 that include believe-01 and girl);

ARG1: represents the thing/person that is to be believed (i.e. the girl is to be the believer of the boy, as depicted in the AMR graph 204 in the edge 208 between the nodes 206 that correspond to believe-01 and boy.

Accordingly, in response to receiving the two sentences 202 and generating the AMR graph 204, the semantic vector representation program 108A, 108B may identify two entities, boy and girl, represented in corresponding nodes 206. Furthermore, between the identified two entities (boy and girl), the semantic vector representation program 108A, 108B may identify two paths/trees (or Steiner/Steiner trees) that connects the corresponding nodes 206 for the entities, boy and girl. More specifically, based on the AMR graph 204, the semantic vector representation program 108A, 108B may identify two paths/trees such as:

Steiner tree 1=Boy→ARG1→believe-01→ARG0→Girl: as represented by the dotted lines in FIG. 2, represents the path/tree (or the Steiner tree) that includes the semantic relation that the girl believes the boy; and Steiner tree 2=Boy→ARG0→want-01→ARG1→believe-01→ARG0→Girl: as represented by the solid lines as well as the dotted line between believe-01 and girl, represents the path/tree (or the Steiner tree) that includes the semantic relation that the boy wants the girl to believe in someone.

As such, when combined, the two paths/trees may represent the relation: the boy wants the girl to believe in him.

Figure 3:
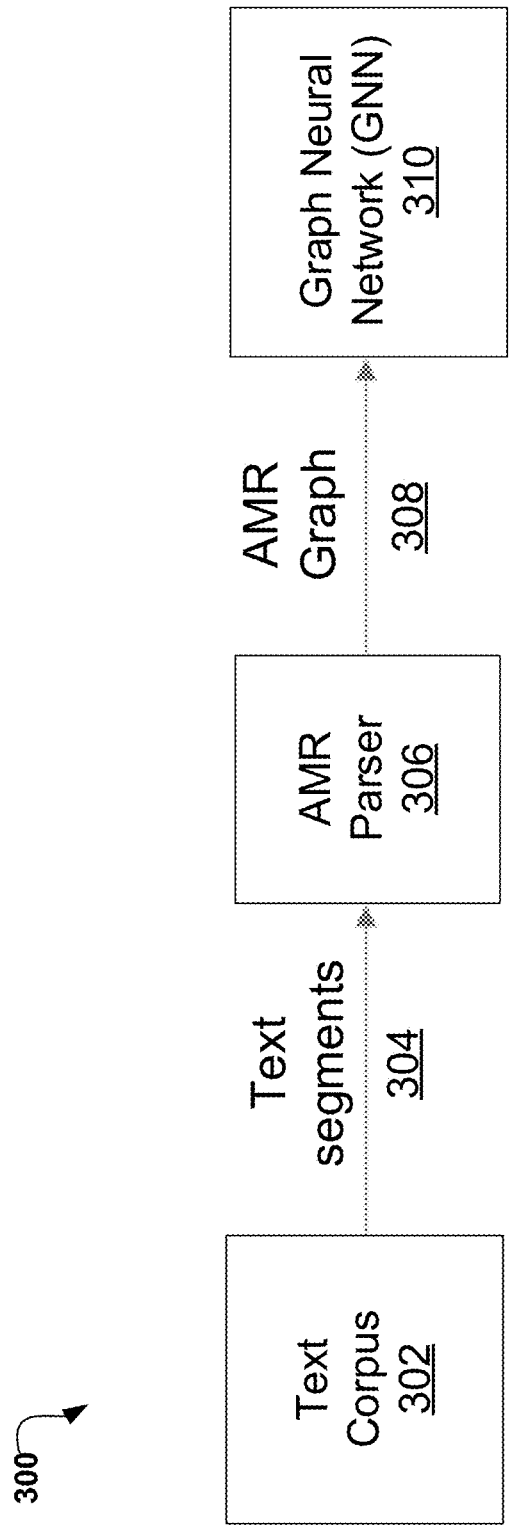
FIG. 3 is an operational flowchart illustrating the steps carried out by a program for training a graph neural network (GNN) to generate vector embeddings corresponding to an AMR graph according to one embodiment.

Referring now to FIG. 3, an operational flowchart illustrating the steps carried by semantic vector representation program 108A, 108B for training a graph neural network (GNN) to generate vector embeddings corresponding to an AMR graph according to one embodiment is depicted.

Specifically, in the context of neural networks, vector embeddings may include learned vector representations of discrete variables such as words and phrases in a sentence. Furthermore, a GNN is a class of a neural networks that may process data represented by graph data structures, such as AMR graphs. Thus, generally, the GNN may accept AMR graphs as input, having information loaded into its nodes, edges and global context, and progressively transform the information into vector embeddings representing the connectivity between the nodes and edges of the inputted AMR graph. As such, in the context of the present invention, the GNN 310 may receive as training data the AMR graphs 308 generated from the corpus of text 302, and then may learn the vector representation of the nodes 206 and edges 208 in the AMR graph 204 with the objective to predict and identify the role/label of each node 206 and edge 208 based on attributes and information derived from the nodes 206 and edges 208 in the AMR graph 204. Thus, for each node, the GNN 310 may return a learned node-vector embedding. Similarly for each edge, the GNN 310 may return a learned per-edge vector embedding, and in the global-context, may return a single embedding for an entire AMR graph. Accordingly, training the GNN 310 may not require any additional data beyond the inputted AMR graphs. Furthermore, although a GNN is specifically used in accordance with one embodiment of the present invention, other model or machine learning architecture may be used to compute vector embeddings.

Thus, referring back to the elements in FIG. 3, the semantic vector representation program 108A, 108B may train the GNN 310 to generate vector embeddings by first receiving as input a text corpus at 302. For example, the text corpus 302 received by the semantic vector representation program 108A, 108B may include text segments (i.e. one or more sentences) comprising natural language text. According to one embodiment, the semantic vector representation program 108A, 108B may divide the text corpus into one or more text segments (i.e. the one or more sentences) as depicted at 304. Additionally, the semantic vector representation program 108A, 108B may parse the text segments using an AMR parser 306 to, in turn, generate an AMR graph 308 for each sentence as previously described in FIG. 2 at 204. Specifically, the semantic vector representation program 108A, 108B may include an AMR parser 306, and/or may leverage a software program 114 (FIG. 1) that includes AMR parsing software, to generate the AMR graphs for each sentence as depicted at 308. Thereafter, the semantic vector representation program 108A, 108B may input the generated AMR graphs 308 as training data into the GNN 310 to continuously train the GNN 310 to determine vector embeddings of the nodes and edges in the AMR graphs, whereby each of the vector embeddings may be a real-value vector that encodes the meaning of a text segment (i.e. encodes a sentence and/or word associated with the text segment) for use in such technical fields as machine translation, question answering, ontology induction, automated reasoning, code generation, etc.

Figure 4:
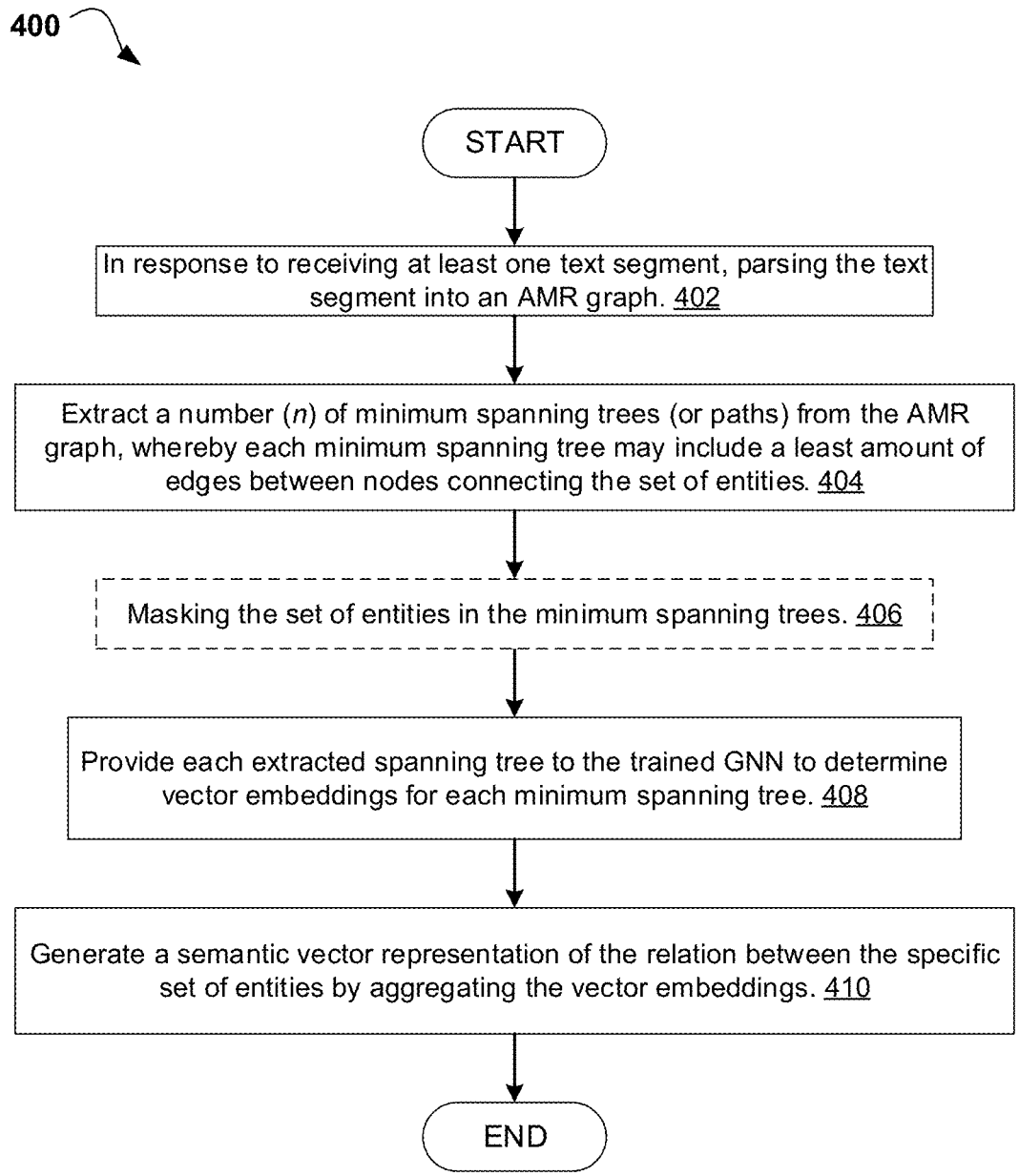
FIG. 4 is an operational flowchart illustrating the steps carried out by a program for automatically generating a semantic vector representation of a relation between a specific set of entities in natural language text according to one embodiment.
Figure 5:
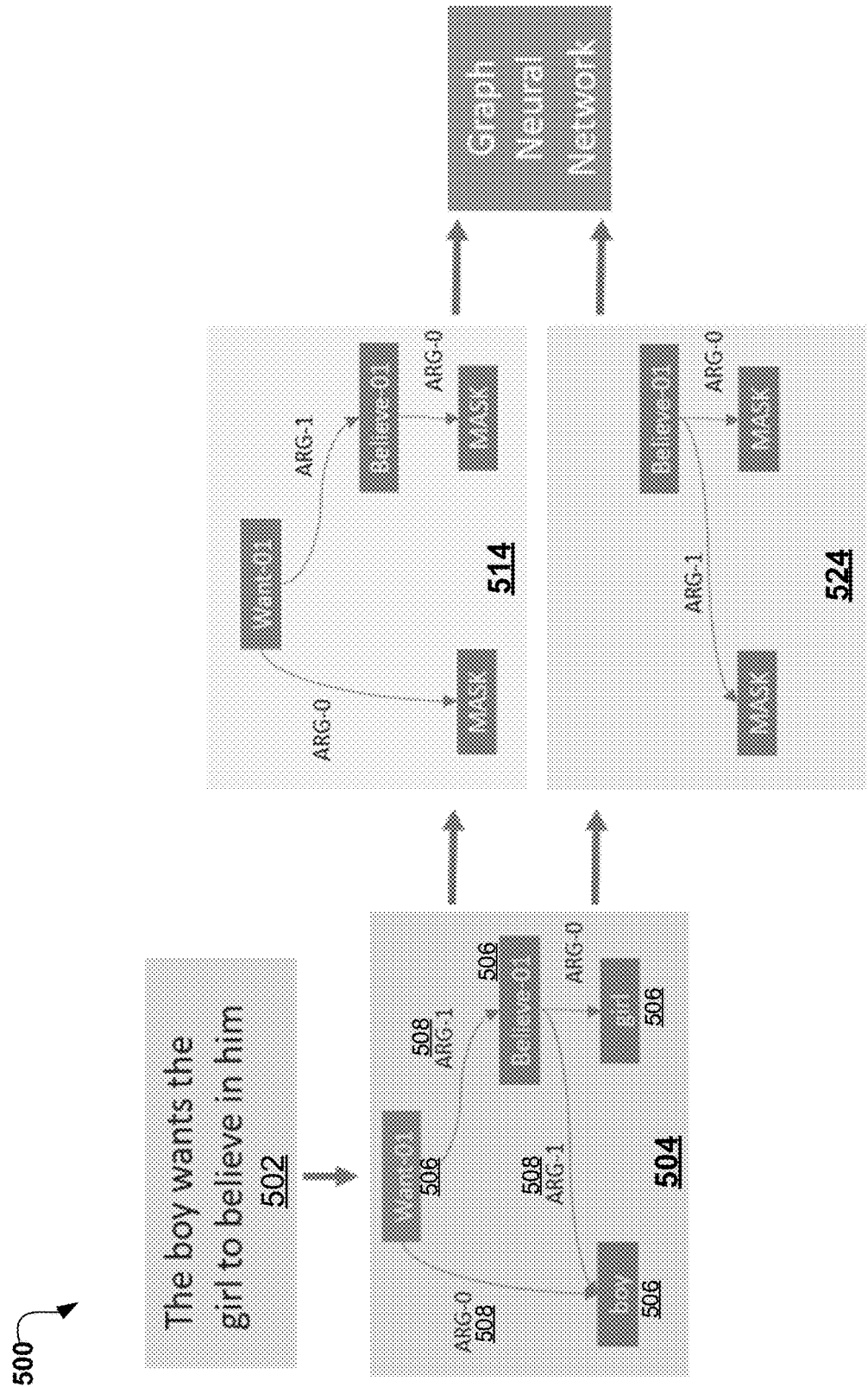
FIG. 5 is an exemplary diagram illustrating application of the operational flowchart presented in FIG. 4 according to one embodiment.

Referring now to FIG. 4, and operational flowchart illustrating the steps carried out by the semantic vector representation program 108A, 108B for automatically generating a semantic vector representation of a relation between a specific set of entities in a natural language sentence according to one embodiment is depicted. Specifically, at 402, in response to receiving at least one text segment that includes a set of entities, the semantic vector representation program 108A, 108B may parse the text segment into an AMR graph using an AMR parser, whereby the AMR graph includes nodes representing the set of entities. Specifically, as depicted in FIG. 5 (and continuing from the example provided in FIG. 2), an exemplary diagram 500 illustrating application of the operational flowchart 400 shows that the at least one text segment may be a sentence 502 such as: "The boy wants to believe in the girl." Therefore, in response to receiving the sentence, the semantic vector representation program 108A, 108B may generate an AMR graph 504 which depicts the meaning of the sentence in machine-readable form. As previously described, the AMR graph 504 may be a rooted, labeled, DAG representing whole sentences based on PENMAN notation such that nodes 506 may represent concepts (including entities), edges 508 may represent semantic relations between nodes 506, and function words such as "to" may be omitted altogether. Accordingly, and as further depicted in diagram 500, the sentence 502 may include concepts such as two entities, boy and girl, which may be represented by nodes 506 in the AMR graph 504 generated by the semantic vector representation program 108A, 108B. Nodes 506 may also include concepts such as verbs, including the verbs "want" and "believe/believed" from the sentence 502 in nodes 506 as well.

Next, at 404, the semantic vector representation program 108A, 108B may extract a number (n) of minimum Steiner trees (or paths/trees) from the AMR graph 504, whereby each minimum Steiner tree may include the least amount of edges between nodes connecting the set of entities. Specifically, a minimum Steiner tree of an AMR graph may be a subgraph that is a tree that connects different nodes/entities using the least amount of edges to represent at least one relation (or sub-relation, i.e. as opposed to the overall relation) between the nodes/entities. More specifically, and as previously described, an objective of the present invention is to determine the semantic vector representation of the relation between at least two entities. As such, the relation between two entities should be represented by all paths/trees between the two entities in the AMR graph 504. Accordingly, and as depicted at 514 and 524, the semantic vector representation program 108A, 108B may extract a number (n) of minimum Steiner trees (i.e. paths/trees) from the AMR graph 504 that representing the relations between the entities, boy and girl.

As depicted in FIG. 5 (and previously described with respect to FIG. 2), between the identified two entities (boy and girl), the semantic vector representation program 108A, 108B may identify two paths/trees (or Steiner trees) that connects the nodes 206 corresponding to the entities. More specifically, based on the generated AMR graph 504, the semantic vector representation program 108A, 108B may identify two paths/trees such as:

Steiner tree 514=Boy→ARG0→want-01→ARG1→believe-01→ARG0→Girl: which represents the path/tree (or the Steiner tree) that includes the semantic relation that the boy wants the girl to believe in someone; and Steiner tree 524=Boy→ARG1→believe-01→ARG0→Girl: which represents the path/tree (or the Steiner tree) that includes the semantic relation that the girl believes the boy.

As such, each Steiner tree/path/tree represents a relation between the two entities in the AMR graph 504, and when combined, the two paths/trees may represent the overall relation: the boy wants the girl to believe in him.

Figure 6:
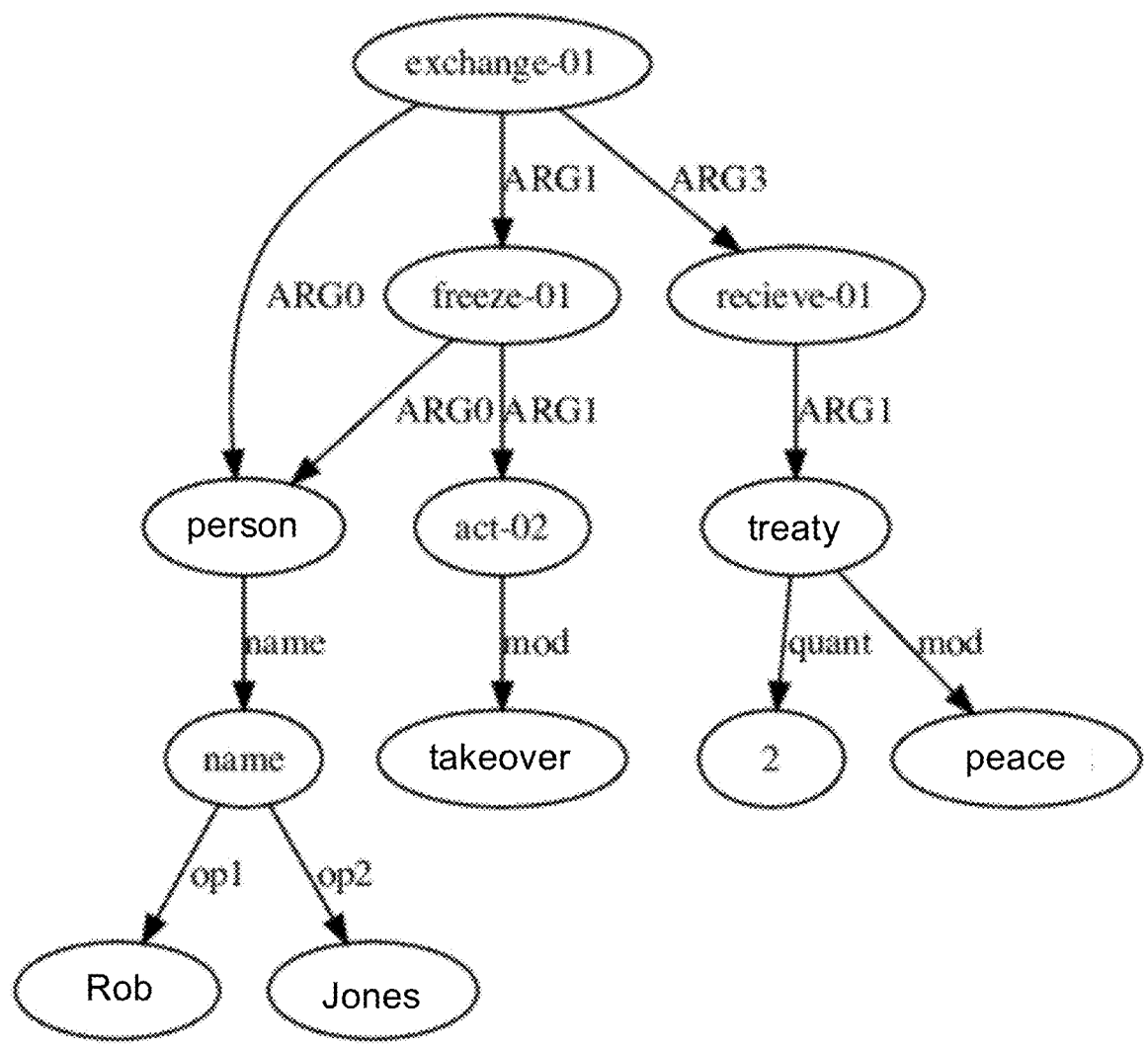
FIG. 6 is another example of an AMR graph corresponding to a specific sentence according to one embodiment

To further explain extracting a number (n) of minimum Steiner trees, FIG. 6 provides another example of an AMR graph 600 for the sentence "Rob Jones froze his takeover actions in exchange for two peace treaties." The semantic vector representation program 108A, 108B may determine the relation between two entities "Rob Jones" and "two peace treaties." However, the entire AMR graph 600 does not represent the relations between "Rob Jones" and "two peace treaties," but is instead a complete relation between 3 entities: "Rob Jones," "two peace treaties," and "takeover actions." As previously described, the relation between two entities should be represented by all paths/trees between the two entities in the AMR graph 600. Since, in the AMR graph 600 there are many paths/trees, the semantic vector representation program 108A, 108B may be limited to determine the top-n paths/trees (Steiner trees) with the smallest number of edges. According to one embodiment, n may be a default number determined by the semantic vector representation program 108A, 108B or a number defined by a user, such as determining to extract 2 minimum Steiner trees between two entities.

Referring back to FIG. 4, the semantic vector representation program 108A, 108B may optionally mask the entities in the Steiner trees at 406. More specifically, the semantic vector representation program 108A, 108B may mask the entities by replacing the entities, boy and girl, with special symbols. According to one embodiment, the semantic vector representation program 108A, 108B may be trained to mask entities based the entities type and the verbs that connect the entities. For example, given the two sentences—"John relocates to New York" and "Apple relocates to New York"—the first relation between John and New York is "live_in" while the second relation is "base_in," (people will not say Apple lives in New York). Therefore, in order to recognize the relation live_in, the semantic vector representation program 108A, 108B may not mask the entities. In another examples, two sentences may be provided—"He pays Intel $100" and "Apple pays Google $10 billion." In this case, the entities may not matter as much as the verb between the entities (i.e. pay). Therefore, the semantic vector representation program 108A, 108B may mask the entities so that the two sentences look similar. According to one embodiment, masking may also serve as a way of training the GNN or any other model architecture for generating vector embeddings. The masking could be randomly performed on a subset of the nodes, no nodes at all, or all the nodes.

Then, at 408, the semantic vector representation program 108A, 108B may provide each extracted Steiner tree to the trained GNN to determine vector embeddings for each minimum Steiner tree. As previously described, the vector embeddings may be a real-value vector that encodes the meaning of a text segment and/or specific words (such as entities) in a text segment. Specifically, for example, the trained GNN (g) may take Steiner tree 514 (path/tree 1, or P1) and Steiner tree 524 (path/tree 2, or P2) as input, and then may return vector representation of the nodes corresponding to the entities, boy and girl. Formally, the vector representations (V) may look as followed:

V1(Boy)=g(P1, boy) is the vector representation of entity boy in the path/tree (tree) P1

V2(Boy)=g(P2, boy) is the vector representation of entity boy in the path/tree (tree) P2

V1(Girl)=g(P1, girl) is the vector representation of entity girl in the path/tree (tree) P1

V2(Girl)=g(P2, girl) is the vector representation of entity girl in the path/tree (tree) P2

Next, at 410, the semantic vector representation program 108A, 108B may generate a semantic vector representation of the relation between the specific set of entities. Specifically, the semantic vector representation program 108A, 108B may generate the semantic vector representation by aggregating the vector embeddings returned by the trained GNN for a given sentence, whereby aggregating the vector embeddings may include taking a vector aggregation function value of the vector embeddings, such as mean value. For example, the semantic vector representation program 108A, 108B may determine the final vector representation of the relation between boy and girl by taking the mean value of the vector embeddings provided by the trained GNN, whereby the final vector representation between boy and girl from the AMR graph 504 may be calculated as: [(V1(Boy)+V2(Boy))/2, (V1(Girl)+V2(Girl))/2]. According to one embodiment, mean value is just one of possible vector aggregation functions. For example, other vector aggregation functions used by the semantic vector representation program 108A, 108B may include sum, dot product, and/or another deep learning model.

It may be appreciated that FIGS. 1-6 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
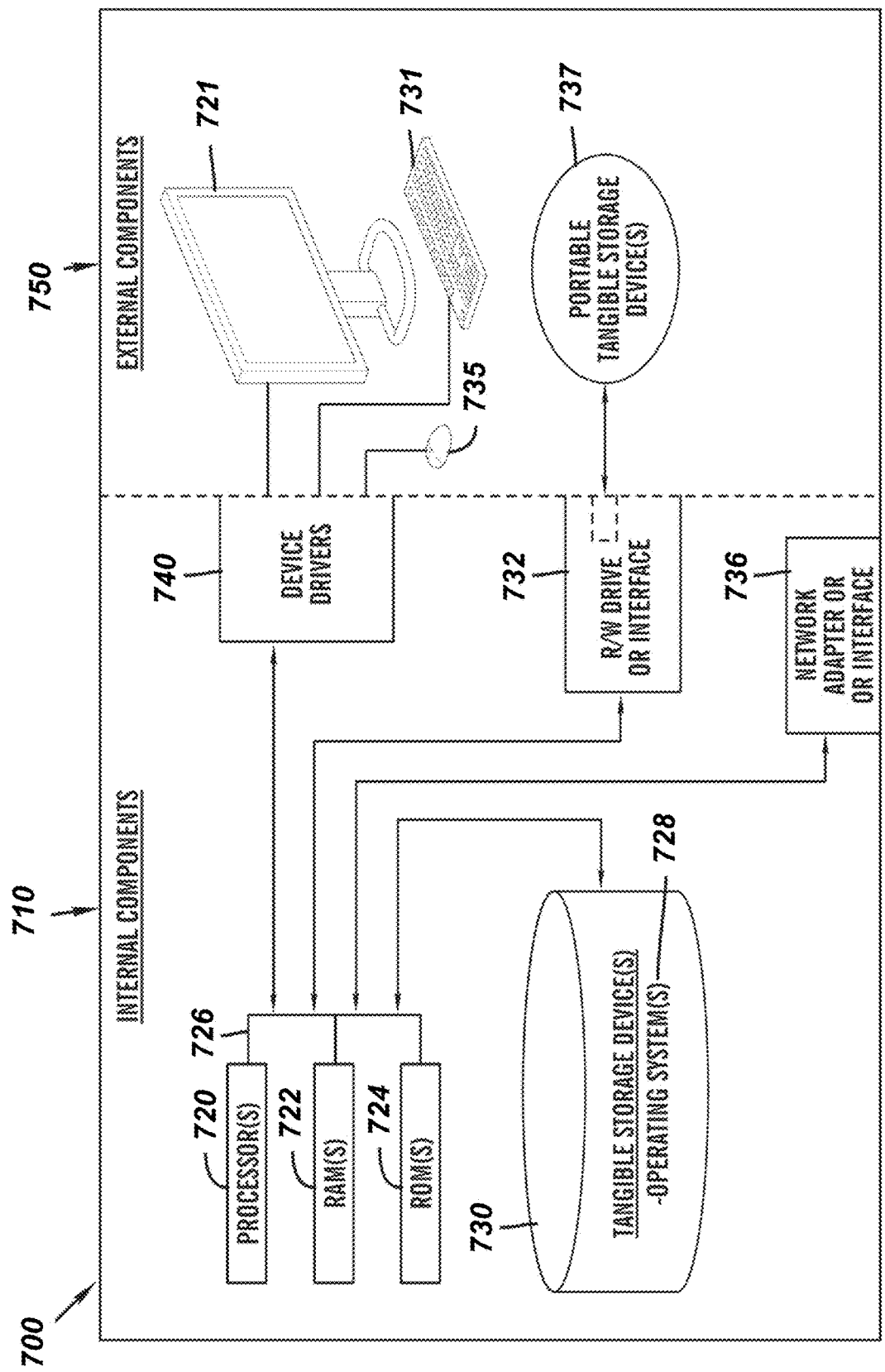
FIG. 7 is a block diagram of the system architecture of the program for training the GNN and automatically generating a semantic vector representation of a relation between a specific set of entities in natural language text according to one embodiment.

FIG. 7 is a block diagram 700 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 and external components 750 illustrated in FIG. 7. Each of the sets of internal components 710 includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the Semantic vector representation program 108A (FIG. 1) in client computer 102 (FIG. 1), and the Semantic vector representation program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 6, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an Semantic vector representation program 108A and 108B (FIG. 1), can be stored on one or more of the respective portable computer-readable tangible storage devices 737, read via the respective R/W drive or interface 732, and loaded into the respective hard drive 730.

Each set of internal components 710 also includes network adapters or interfaces 736 such as a TCP/IP adapter cards, wireless Wi-Fi interface cards, or 3G or 4G wireless interface cards or other wired or wireless communication links. The Semantic vector representation program 108A (FIG. 1) and software program 114 (FIG. 1) in client computer 102 (FIG. 1), and the Semantic vector representation program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the Semantic vector representation program 108A (FIG. 1) and software program 114 (FIG. 1) in client computer 102 (FIG. 1) and the Semantic vector representation program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 can include a computer display monitor 721, a keyboard 731, and a computer mouse 735. External components 750 can also include touch screens, virtual keyboards, touch pads, pointing devices, and other human interface devices. Each of the sets of internal components 710 also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
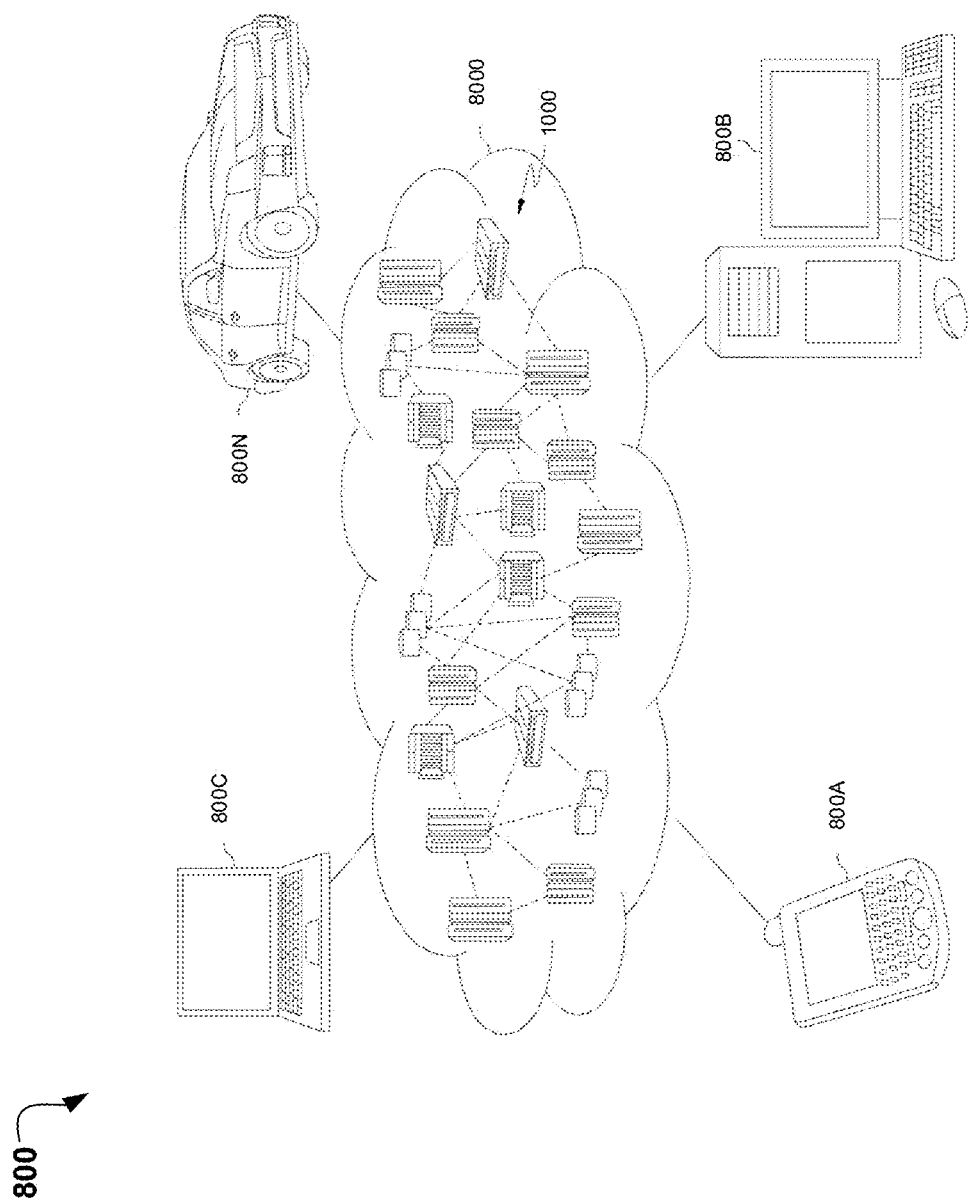
FIG. 8 is a block diagram of an illustrative cloud computing environment including the computer system depicted in FIG. 1, in accordance with an embodiment of the present disclosure.

Referring now to FIG. 8, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 8000 can communicate with any type of computerized device over any type of network and/or network addressable connection (e.g., using a web browser).

Figure 9:
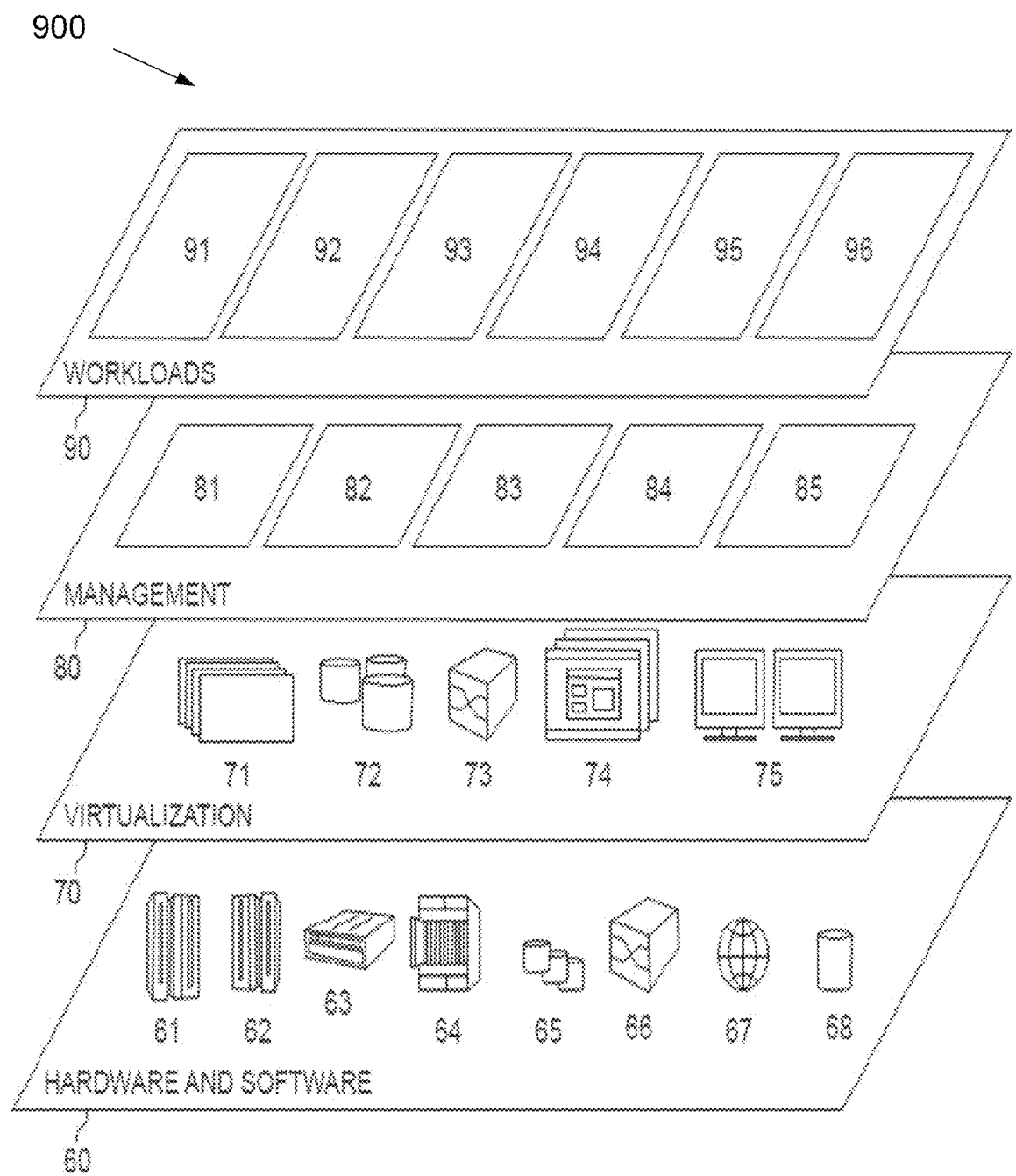
FIG. 9 is a block diagram of functional layers of the illustrative cloud computing environment of FIG. 8, in accordance with an embodiment of the present disclosure.

Referring now to FIG. 9, a set of functional abstraction layers 900 provided by cloud computing environment 800 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and UXaaS 96. A semantic vector representation program 108A, 108B (FIG. 1) may be offered "as a service in the cloud" (i.e., Software as a Service (SaaS)) for applications running on computing devices 102 (FIG. 1) and may automatically generate a semantic vector representation of a relation between a specific set of entities in natural language text.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating a semantic vector representation of a relation between a specific set of entities in natural language text, comprising:
   in response to receiving a text segment comprising a set of entities, automatically parsing the text segment into an abstract meaning representation (AMR) graph comprising nodes representing the set of entities;
   extracting a number of trees from the AMR graph, wherein the number of trees comprises minimum Steiner trees, wherein each minimum Steiner tree represents a path and tree between a first entity and at least one second entity from the set of entities, and wherein each Steiner tree comprises a minimum amount of edges between the nodes corresponding to the first entity and the at least one second entity;
   using a trained graph neural network (GNN) to determine vector embeddings for each of the extracted number of minimum Steiner trees; and
   in response to receiving the vector embeddings returned by the trained GNN, aggregating the vector embeddings to generate the semantic vector representation of the relation between the specific set of entities.

2. The method of claim 1, wherein aggregating the vector embeddings further comprises:
   taking a vector aggregation function value of the vector embeddings returned by the trained GNN.

3. The method of claim 1, further comprising:
   masking the set of entities in the minimum Steiner trees.

4. The method of claim 1, further comprising:
   training the GNN to learn and generate the vector embeddings of the nodes and edges associated inputted AMR graphs.

5. The method of claim 4, wherein training the GNN, further comprises
   receiving as input a text corpus;
   dividing the text corpus into text segments;
   parsing the text segments into AMR graphs; and
   inputting the AMR graphs as training data into the GNN to train the GNN to determine vector embeddings of the AMR graphs.

6. The method of claim 1, wherein automatically parsing the text segment in the AMR graph, further comprises:
   using an AMR parser to automatically parse the text segment.

7. The method of claim 6, wherein the vector embeddings comprise a real-value vector that encodes a meaning of the text segment.

8. A computer system for automatically generating a semantic vector representation of a relation between a specific set of entities in natural language text, comprising:
   one or more processors, one or more computer-readable memories, one or more computer-readable storage media, and program instructions stored on at least one of the one or more computer-readable storage media for execution by at least one of the one or more processors via at least one of the one or more memories, wherein the computer system is capable of performing a method comprising:
   in response to receiving a text segment comprising a set of entities, automatically parsing the text segment into an abstract meaning representation (AMR) graph comprising nodes representing the set of entities;
   extracting a number of minimum Steiner trees from the AMR graph, wherein each minimum Steiner tree represents a path and tree between a first entity and at least one second entity from the set of entities, and wherein each Steiner tree comprises a minimum amount of edges between the nodes corresponding to the first entity and the at least one second entity;
   using a trained graph neural network (GNN) to determine vector embeddings for each of the extracted number of minimum Steiner trees; and
   in response to receiving the vector embeddings returned by the trained GNN, aggregating the vector embeddings to generate the semantic vector representation of the relation between the specific set of entities.

9. The computer system of claim 8, wherein aggregating the vector embeddings further comprises:
   taking a vector aggregation function value of the vector embeddings returned by the trained GNN.

10. The computer system of claim 8, further comprising:
    masking the set of entities in the minimum Steiner trees.

11. The computer system of claim 8, further comprising:
    training the GNN to learn and generate the vector embeddings of the nodes and edges associated with inputted AMR graphs.

12. The computer system of claim 11, wherein training the GNN, further comprises
    receiving as input a text corpus;
    dividing the text corpus into text segments;
    parsing the text segments into AMR graphs; and
    inputting the AMR graphs as training data into the GNN to train the GNN to determine vector embeddings of the AMR graphs.

13. The computer system of claim 8, wherein automatically parsing the text segment in the AMR graph, further comprises:
    using an AMR parser to automatically parse the text segment.

14. The computer system of claim 8, wherein the vector embeddings comprise a real-value vector that encodes a meaning of the text segment.

15. A computer program product for automatically generating a semantic vector representation of a relation between a specific set of entities in natural language text, comprising:
    one or more computer-readable storage media and program instructions stored on at least one of the one or more computer-readable storage media, the program instructions executable by a processor, the program instructions comprising:
    in response to receiving a text segment comprising a set of entities, automatically parsing the text segment into an abstract meaning representation (AMR) graph comprising nodes representing the set of entities;
    extracting a number of minimum Steiner trees from the AMR graph, wherein each minimum Steiner tree represents a path and tree between a first entity and at least one second entity from the set of entities, and wherein each Steiner tree comprises a minimum amount of edges between the nodes corresponding to the first entity and the at least one second entity;
    using a trained graph neural network (GNN) to determine vector embeddings for each of the extracted number of minimum Steiner trees; and
    in response to receiving the vector embeddings returned by the trained GNN, aggregating the vector embeddings to generate the semantic vector representation of the relation between the specific set of entities.

16. The computer program product of claim 15, wherein aggregating the vector embeddings further comprises:
   taking a vector aggregation function value of the vector embeddings returned by the trained GNN.

17. The computer program product of claim 15, further comprising:
   masking the set of entities in the minimum Steiner trees.

18. The computer program product of claim 15, further comprising:
   training the GNN to learn and generate the vector embeddings of the nodes and edges associated with inputted AMR graphs.

19. The computer program product of claim 18, wherein training the GNN, further comprises
   receiving as input a text corpus;
   dividing the text corpus into text segments;
   parsing the text segments into AMR graphs; and
   inputting the AMR graphs as training data into the GNN to train the GNN to determine vector embeddings of the AMR graphs.

20. The computer program product of claim 15, wherein the vector embeddings comprise a real-value vector that encodes a meaning of the text segment.

\* \* \* \* \*